US012786917B2

United States Patent

(12) United States Patent
Chen et al.

(10) Patent No.: US 12,786,917 B2
(45) Date of Patent: Nov. 3, 2026

(54) METHOD AND DEVICE FOR SENSING SYNCHRONIZATION, AND COMPUTER-READABLE MEDIUM

(71) Applicant: ZTE CORPORATION, Shenzhen (CN)

(72) Inventors: Shijun Chen, Shenzhen (CN); Dawei Chen, Shenzhen (CN); Junqiang Li, Shenzhen (CN); Shuqiang Xia, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 115 days.

(21) Appl. No.: 18/859,561

(22) PCT Filed: May 30, 2023

(86) PCT No.: PCT/CN2023/097098
§ 371 (c)(1),
(2) Date: Oct. 24, 2024

(87) PCT Pub. No.: WO2024/037103
PCT Pub. Date: Feb. 22, 2024

(65) Prior Publication Data
US 2025/0267606 A1 Aug. 21, 2025

(30) Foreign Application Priority Data
Aug. 19, 2022 (CN) ......................... 202211001292.1

(51) Int. Cl.
*H04W 56/00* (2009.01)
*G01S 17/46* (2006.01)

(52) U.S. Cl.
CPC ......... *H04W 56/0055* (2013.01); *G01S 17/46* (2013.01)

(58) Field of Classification Search
CPC ........................... H04W 56/0065; G01S 17/46
(Continued)

(56) References Cited

U.S. PATENT DOCUMENTS 11,009,582 B2 5/2021 Hu et al.
2017/0170950 A1* 6/2017 Kim .................... H04L 27/2627
2020/0142023 A1 5/2020 Markhovsky et al.

FOREIGN PATENT DOCUMENTS

CN 104316946 A 1/2015
CN 106231670 A 12/2016
(Continued)

OTHER PUBLICATIONS (ISA/237) Written Opinion of the International Searching Authority issued on Aug. 24, 2023.
(Continued)

*Primary Examiner* — Christopher R Crompton
(74) *Attorney, Agent, or Firm* — NZ Carr Law Office

(57) ABSTRACT

Provided in the present disclosure is a method for sensing synchronization. The method comprises: determining a transmitting time, a transmitting angle, a receiving time and a receiving angle of a plurality of sensing signals; determining a theoretical reflection position of the sensing signal, according to position of a transmitting end, position of a receiving end, the receiving angle of the sensing signal and the transmitting angle of the sensing signal; determining a distance difference of the sensing signal, wherein the distance difference is an absolute value of a difference between a time distance and a position distance of the sensing signal, the time distance is a transmission distance between the time of transmitting the sensing signal and the time of receiving the sensing signal, and the position distance is the sum of a distance between the theoretical reflection position of the sensing signal and the receiving end and a distance between the theoretical reflection position of the sensing signal and
(Continued)

the transmitting end; selecting a primary path distance difference from the distance differences; and determining, according to the primary path distance difference, a synchronization error between the transmitting end and the receiving end. Further provided in the present disclosure are a device for sensing synchronization and a computer-readable medium.

15 Claims, 8 Drawing Sheets

(58) Field of Classification Search
USPC .......................................................... 370/350
See application file for complete search history.

(56) References Cited

FOREIGN PATENT DOCUMENTS

| | | | |
|---|---|---|---|
| CN | 109581281 | A | 4/2019 |
| CN | 110798886 | A | 2/2020 |
| CN | 112003658 | A | 11/2020 |
| CN | 114650595 | A | 6/2022 |
| WO | 2019164370 | A1 | 8/2019 |

OTHER PUBLICATIONS

The international search report of the corresponding PCT Application No. PCT/CN2023/097098 mailed on Aug. 24, 2023.
EESR of the corresponding EP Patent Application No. 23854009.0 dated Jul. 11, 2025.

* cited by examiner

METHOD AND DEVICE FOR SENSING SYNCHRONIZATION, AND COMPUTER-READABLE MEDIUM

CROSS REFERENCE TO RELATED APPLICATIONS

This application is a national phase of International Application No. PCT/CN2023/097098, with an international filing date of filed on May 30, 2023, which is based upon and claims priority to Chinese Patent Application No. 202211001292.1, filed on Aug. 19, 2022, the entire contents of all of which are incorporated herein by reference.

TECHNICAL FIELD

The present disclosure relates to the technical field of sensing, and in particular to a method and device for sensing synchronization, and a non-transitory computer-readable medium.

BACKGROUND

Synchronization (time synchronization) between two base stations is required for tasks such as cooperative sensing.

However, in a complex multipath environment, it is usually difficult to determine whether there is a direct path between the two base stations, so it is also difficult to synchronize the two base stations.

SUMMARY

The disclosure provides a method and device for sensing synchronization, and a non-transitory computer-readable medium.

In a first aspect, an example of the disclosure provides a method for sensing synchronization. The method includes:

- determining a transmitting time, a transmitting angle, a receiving time and a receiving angle of a plurality of sensing signals;
- determining a theoretical reflection position of the sensing signal, according to position of a transmitting end, position of a receiving end, the receiving angle of the sensing signal and the transmitting angle of the sensing signal;
- determining a distance difference of the sensing signal, where the distance difference is an absolute value of a difference between a time distance and a position distance of the sensing signal, the time distance is a transmission distance of the sensing signal between the transmitting time and the receiving time, and the position distance is a sum of two distance, one distance is a distance between the theoretical reflection position of the sensing signal and the receiving end, the other one distance is a distance between the theoretical reflection position of the sensing signal and the transmitting end;
- selecting a primary path distance difference from the distance differences; and
- determining a synchronization error between the transmitting end and the receiving end according to the primary path distance difference.

BRIEF DESCRIPTION OF DRAWINGS

In the accompanying drawings of examples of the disclosure.

DETAILED DESCRIPTION

Figure 1:
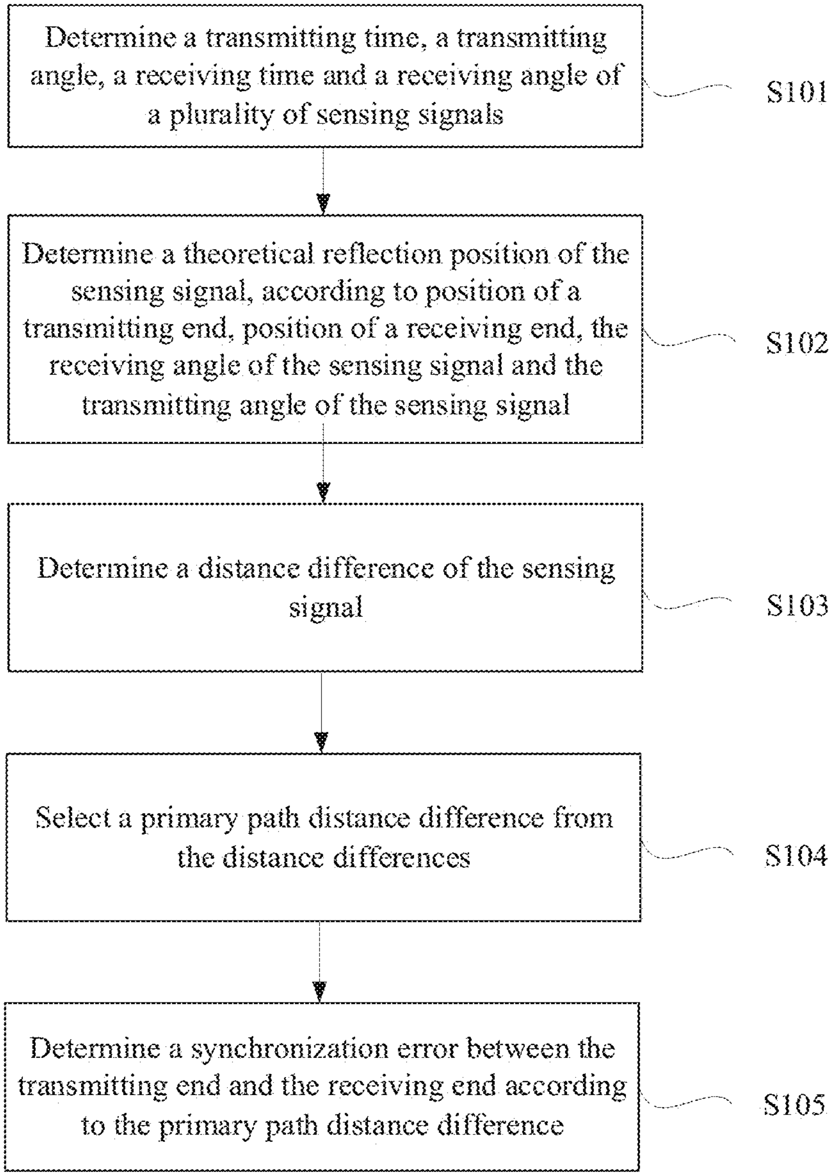
FIG. 1 is a flowchart of a method for sensing synchronization according to an example of the disclosure.

In order to enable those skilled in the art to better understand the technical solutions of the disclosure, a method and apparatuses for sensing synchronization, and a non-transitory computer-readable medium provided by examples of the disclosure are described in detail below with reference to the accompanying drawings.

The disclosure will be described more fully hereinafter with reference to the accompanying drawings, but the examples shown may be embodied in different forms, and the disclosure should not be construed as limited to the examples set forth hereinafter. Instead, these examples are provided for the purpose of making the disclosure thorough and complete, and will enable those skilled in the art to fully understand the scope of the disclosure.

The accompanying drawings of the examples of the disclosure provide a further understanding of the examples of the disclosure as a constituent part of the description and illustrate the disclosure with detailed examples, and are not intended to limit the disclosure. The above and other features and advantages will become more apparent to those skilled in the art by describing the examples in detail with reference to the accompanying drawings.

The disclosure may be described with reference to a plan and/or a sectional view with the aid of desirable schematic diagrams of the disclosure. Accordingly, the example diagrams may be modified according to manufacturing techniques and/or tolerances.

All the examples of the disclosure and features in the examples can be combined mutually without conflict.

The terms used in the disclosure are merely to describe the specific examples, instead of limiting the disclosure. As used in the disclosure, the term "and/or" includes any and all possible combinations of one or more of associated items listed. As used in the disclosure, the singular forms "a" "an" and "the" are also intended to include the plural forms, unless clearly indicated otherwise in the context. The terms "comprise", "include" and "made from" used in the disclosure specify the presence of features, integers, steps, operations, elements, and/or assemblies, but do not exclude the presence or addition of one or more other features, integers, steps, operations, elements, components, and/or their groups.

Unless defined otherwise, all the terms (including technical and scientific terms) used in the disclosure have the same meaning as commonly understood by those of ordinary skill in the art. It is also to be understood that the terms, such as those defined in commonly used dictionaries, should be interpreted as having the same meaning as in the context of the relevant art and the disclosure, instead of the idealized or overly-formal meaning unless clearly defined in the disclosure.

The disclosure is not limited to the examples shown in the drawings, but includes modifications of configurations formed based on manufacturing processes. Thus, regions illustrated in the drawings are schematic, and shapes of the regions shown in the drawings illustrate specific shapes of regions of elements, but are not intended to be limitative.

A ubiquitous intelligence technology gradually penetrates into daily life and all walks of life, offering great convenience to the life, and greatly assisting in industrial upgrade and industrial efficiency improvement.

since ubiquitous intelligence can only be achieved based on a ubiquitous system, and a wireless communication network can satisfy the ubiquity, the ubiquitous intelligence (such as ubiquitous sensing) through the wireless communication network has become one of the important technical routes.

Currently, in-depth research of a ubiquitous sensing technology in the field of radar has been carried out, and its application scenarios mainly include aircraft sensing (for example, airport radar), short-range sensing (for example, vehicle radar), etc., and these application scenarios are simple scenarios. However, the ubiquitous sensing in complex environments (such as an indoor environment with many objects, a ground environment with many buildings, a multi-vehicle environment on a road, and a multi-person environment in a shopping mall) is still constrained by many factors, such that the research on the ubiquitous sensing is insufficient, and practicable technologies are fewer.

For example, most of the existing network devices do not have full-duplex function, such that only a cooperative sensing mode can be used. Cooperative sensing requires synchronization (time synchronization) between a transmitting base station and a receiving base station of a sensing signal. However, in some related arts, especially in a complex multipath environment, fixed objects are complicated, and mobile objects such as people and vehicles may also exist. Accordingly, it is generally difficult to determine whether there is a direct path between two base stations, and it is also difficult to determine path through which the signal between the two base stations is actually transmitted, such that synchronization between the two base stations can hardly be implemented according to the signal. Further, the application of ubiquitous sensing is hindered. For example, since accurate synchronization cannot be implemented, a distance cannot be accurately measured.

In a first aspect, an example of the disclosure provides a method for sensing synchronization.

The method of the example of the disclosure is used to sense a time difference between respective time systems of two devices (a transmitting end and a receiving end), so as to implement synchronization (time synchronization) between the two devices. Thus, it is guaranteed that the two devices can perform correct work (for example, position sensing) subsequently.

The transmitting end and the receiving end to which the example of the disclosure is applicable are wireless communication devices, that is, devices capable of transmitting a wireless communication signal and receiving the wireless communication signal.

The transmitting end and the receiving end to which the example of the disclosure is applicable may be devices for cooperative sensing (for example, position sensing), or may be other wireless communication devices.

The method of the example of the disclosure may be performed by a receiving end, a transmitting end, or a third-party controller. Alternatively, a plurality of devices can perform different steps of the method respectively. That is to say, any device may implement the method of the example of the disclosure as long as it can obtain corresponding information and perform corresponding calculation.

As shown in FIG. 1, a method for sensing synchronization in an example of the disclosure includes:

S101: a transmitting time, a transmitting angle, a receiving time and a receiving angle of a plurality of sensing signals are determined.

The sensing signal may be a signal special for sensing synchronization, and may also be a signal transmitted between a transmitting end and a receiving end for other sensing, such as a signal for position sensing, such that position sensing and sensing synchronization can be simultaneously implemented by using the sensing signal.

The transmitting end transmits the sensing signal at the transmitting angle at the transmitting time (a time recorded by a time system of the transmitting end). At least some of the signals are received by the receiving end at the receiving angles at the receiving times (certainly, times recorded by a time system of the receiving end).

Figure 3:
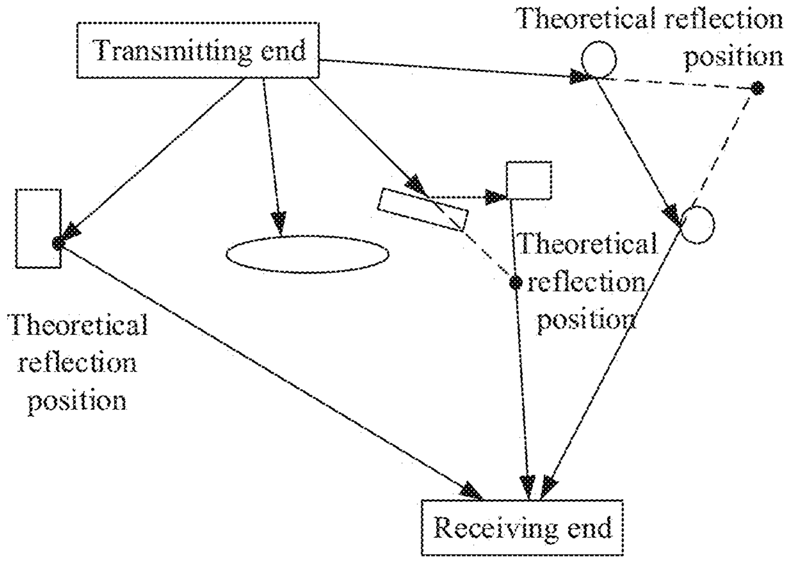
FIG. 3 is a schematic diagram of sensing signal transmission in a method for sensing synchronization according to an example of the disclosure.

With reference to FIG. 3, due to complexity of an environment, the sensing signal transmitted from the transmitting end may be transmitted to the receiving end or not. Transmission paths of the sensing signals transmitted to the receiving end are also diverse. However, the sensing signals used in the example of the disclosure has a receiving time and a receiving angle, such that the sensing signals are the sensing signals received by the receiving end.

That is, each sensing signal is a signal transmitted by the transmitting end at the transmitting angle at the transmitting time and received by the receiving end at the receiving angle at the receiving time.

The transmitting end may transmit a plurality of signals at the same time, and may also transmit a plurality of signals at different times. The transmitting angles of the plurality of signals may be the same (one beam direction) or not.

Figure 5:
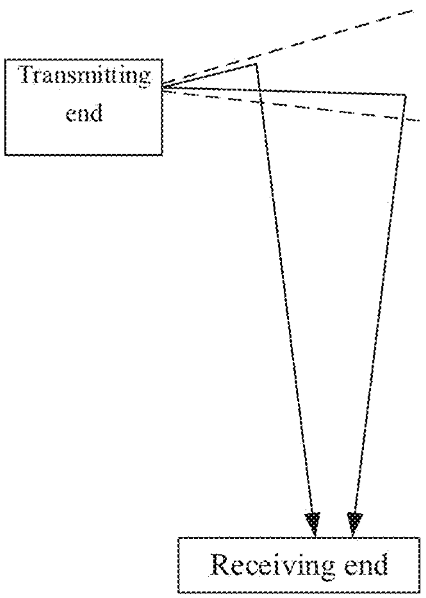
FIG. 5 is a schematic diagram of multipath signal transmission in a method for sensing synchronization according to an example of the disclosure.

With reference to FIG. 5, since what is actually transmitted from the transmitting end is a "beam" with a certain width, beams transmitted at the same time and at the same angle may be received by the receiving end at different times and at different angles after different reflection, and become a plurality of "sensing signals". These sensing signals are coherent, such that they are also called "multipath signals". Each sensing signal corresponds to a "path" of the multipath signals and is a "path signal".

The transmitting end and the receiving end are classified according to work performed by them in this sensing synchronization process, such that a same wireless communication device may be a transmitting end in some sensing synchronization processes and a receiving end in other sensing synchronization processes.

S102: a theoretical reflection position of the sensing signal is determined, according to position of a transmitting end, position of a receiving end, the receiving angle of the sensing signal and the transmitting angle of the sensing signal.

With reference to FIG. 3, an environment in which the transmitting end and the receiving end are located is very complex, and may include a structure of a building, an object placed in a room, moving people and vehicles, etc., and these environmental targets block and reflect signals.

Thus, different sensing signals may actually arrive at the receiving end through different paths, for example, arrive directly without reflection (that is, direct path), arrive after being reflected once (primary path), or arrive after being reflected a plurality of times (multipath). How each sensing signal arrives at the receiving end is usually unpredictable when transmitted.

Figure 4:
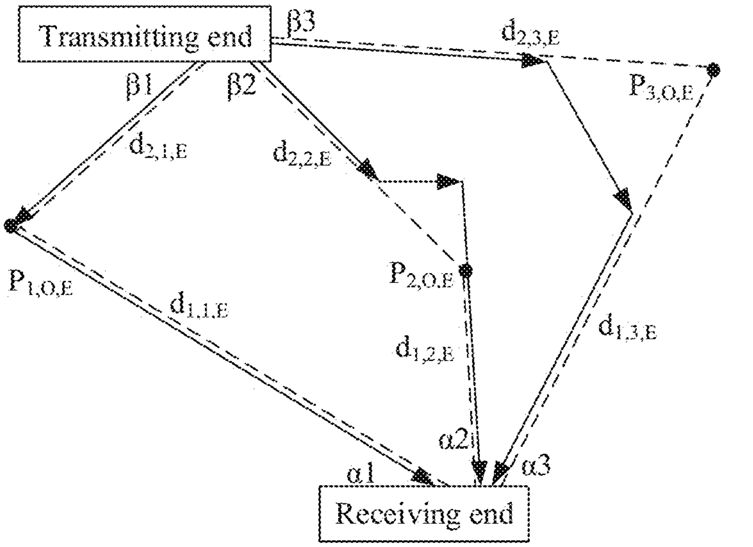
FIG. 4 is a schematic diagram of different path signal transmission in a method for sensing synchronization according to an example of the disclosure.

With reference to FIGS. 3 and 4, in the example of the disclosure, the positions of the transmitting end and the receiving end are known. Accordingly, for each sensing signal, in combination with a transmitting angle (βi) and a receiving angle (αi) of the sensing signal, it can be calculated where the sensing signal is reflected under the condition that the sensing signal "is reflected once only", that is, a theoretical reflection position ($P_{i,\ O,\ E}$) is obtained.

Specifically, with reference to FIG. 4, a transmitting direction of the sensing signal transmitted from the transmitting end and a receiving direction of the sensing signal entering the receiving end can be calculated according to the transmitting angle, and an intersection point of the transmitting direction and the receiving direction is the theoretical reflection position.

It should be understood that for a sensing signal reflected once only (primary path signal), a theoretical reflection position is an actual reflection position. A sensing signal reflected a plurality of times (multipath signals) actually has a plurality of reflection positions, such that a theoretical reflection position is not an actual reflection position. In a case that for a sensing signal do not be reflected (direct path signal), there is no theoretical reflection position at all, and it is not considered.

S103: a distance difference of the sensing signals is determined.

The distance difference is an absolute value of a difference between a time distance and a position distance of the sensing signal. The time distance is a transmission distance of the sensing signal between the transmitting time and the receiving time. The position distance is a sum of two distance, one distance is a distance between the theoretical reflection position of the sensing signal and the receiving end, the other one distance is a distance between the theoretical reflection position of the sensing signal and the transmitting end.

For each sensing signal, the transmission distance (also called "pseudo-range") estimated according to the transfer time is calculated. That is to say, a time difference (which is theoretically a transfer time of the sensing signal) is obtained by subtracting the transmitting time from the receiving time of the sensing signal, then the time difference is multiplied by the speed of light, and an obtained result represents a distance (time distance) that the sensing signal can be transmitted in the period of time.

Meanwhile, in a case that the sensing signal is transmitted from the transmitting end and only reflected once at the theoretical reflection position to reach the receiving end, it can be known that an actual transmission distance of the sensing signal should be equal to a distance between the theoretical reflection position and the transmitting end, plus a distance between the theoretical reflection position and the receiving end. Thus, the position distance of the corresponding sensing signal can be calculated by means of the position of the transmitting end, the position of the receiving end, and the theoretical reflection position of each sensing signal.

Furthermore, for each sensing signal, by subtracting the positional distance from the time distance and taking an absolute value, the "distance difference" can be obtained, that is, the difference of the distances calculated in two ways.

It should be understood that in the example of the disclosure, it is sufficient as long as the distance difference is finally calculated. A specific calculation order and formulas of the position distance and the time distance may be various.

S104: a primary path distance difference is selected from the distance differences.

With reference to FIG. 4, in a case that the sensing signal is really reflected only once at the theoretical reflection position (primary path signal), and no error exists between the time systems of the transmitting end and the receiving end, the position distance and the time distance should be the same, that is, the distance difference should be 0. Correspondingly, in a case that the distance difference of the primary path signal is not 0, it should be caused by an error between the time systems of the transmitting end and the receiving end. That is to say, since the difference obtained by subtracting the receiving time from the transmitting time is not the real transfer time of the sensing signal, and there is an error between the two times systems, the time distance obtained by further calculation is not 0.

Further, since the transmitting end and the receiving end are determined, the error of time distance caused by the time error of all sensing signals is also fixed, such that the plurality of primary path distance differences should conform to a same regulation.

Correspondingly, with reference to FIG. 4, for a sensing signal reflected a plurality of times (multipath signals), an actual transmitting path (solid line in the figure) is different from a transmitting path (dotted line in the figure) determined according to the theoretical reflection position, that is, an actual transmission distance is greater or less than the position distance, that is, a time distance is greater or less than the position distance, such that the calculated distance difference also conforms to another regulation.

Therefore, according to characteristics of each distance difference, one or more distance differences can be selected as the primary path distance differences, that is, the distance differences of the sensing signal subjected to reflection once only. Certainly, the sensing signal corresponding to the primary path distance difference should also be the primary path signal reflected once only at the theoretical reflection position.

S105: a synchronization error between the transmitting end and the receiving end is determined according to the primary path distance difference.

As described above, a value of the primary path distance difference represents a deviation between the time systems of the transmitting end and the receiving end, that is, the synchronization error between the transmitting end and the receiving end.

Therefore, the synchronization error between the transmitting end and the receiving end can be calculated according to the selected primary path distance difference (for example, the primary path distance difference is divided by the speed of light). That is to say, the synchronization error between the transmitting end and the receiving end is sensed, so as to synchronize the transmitting end and the receiving end according to the synchronization error.

It should be understood that any mathematically equivalent manner to the examples of the disclosure falls within the scope of the examples of the disclosure.

For example, it is feasible to divide the distance and distance difference by the speed of light into a time and a time difference, and use the time difference for subsequent steps.

In the examples of the disclosure, the primary path distance difference can be screened out according to the distance difference (the difference between a transmission distance calculated according to primary reflection and a transmission distance calculated according to a time) of the plurality of sensing signals, that is, a sensing signal (primary path signal) which is really subjected to primary reflection is screened out. The primary path distance difference is caused by a time difference (synchronization error) between the time systems of the transmitting end and the receiving end, such that the synchronization error between the transmitting end and the receiving end can be sensed according to the primary path distance difference. Therefore, the examples of the disclosure can accurately implement synchronization (sensing synchronization) between two ends under the influence of a complex multipath environment, and further provide accurate basis for ubiquitous sensing applications, such as implementing accurate distance measurement.

In some examples, a primary path distance difference is selected from the distance differences (S104) as follows:

S1041: a distance difference that is less than a first threshold is selected as the primary path distance difference.

It is found through research that the distance difference of the primary path signal (primary path distance difference) is generally less than the distance difference of the multipath signals. Therefore, as a manner of the example of the disclosure, a distance difference less than the preset first threshold may be selected as the primary path distance difference.

The first threshold is preset, and may be obtained through simulation or set according to experience.

In some examples, with reference to FIG. 2, a primary path distance difference is selected from the distance differences (S104) as follows:

S1042: a distance difference that is less than a first threshold and collectively converges to a second threshold is selected as the primary path distance difference.

It is found through research that the primary path distance differences are small as a whole and also generally concentrated (concentrated on a deviation caused by the time error). Therefore, as another way of the example of the disclosure, the selected primary path distance difference may collectively converge to the preset second threshold besides being less than the first threshold. That is to say, a difference between any two selected primary path distance differences should not be greater than the second threshold.

The second threshold is also preset, and may be obtained through simulation or set according to experience.

In some examples, a primary path distance difference is selected from the distance differences (S104) as follows:

S1043: a minimum distance difference is selected as the primary path distance difference.

As another manner of the example of the disclosure, a distance difference with a smallest value may also be directly selected as the primary path distance difference, which is relatively simple to implement.

In some examples, the number of primary path distance differences is more than one. With reference to FIG. 2, a synchronization error between the transmitting end and the receiving end is determined according to the primary path distance difference (S105) as follows:

S1051: a mean value of the primary path distance differences is determined, and a quotient of the mean value and a speed of light is determined as the synchronization error between the transmitting end and the receiving end.

As a manner of the example of the disclosure, when a plurality of primary path distance differences be determined, a mean value (arithmetic average value) of the plurality of primary path distance differences may be calculated first, then the mean value of the primary path distance differences is divided by the speed of light, and the synchronization error between the transmitting end and the receiving end is obtained.

The above manner makes full use of the data of the plurality of primary path signals, and can eliminate errors caused by unexpected factors and implement high-precision sensing synchronization.

It should be understood that specific manners of example of the disclosure are not limited thereto. For example, the synchronization error can also be calculated according to a median of the plurality of primary path distance differences. Alternatively, the median can also be used directly to calculate the synchronization error when there is only one primary path distance difference.

Figure 2:
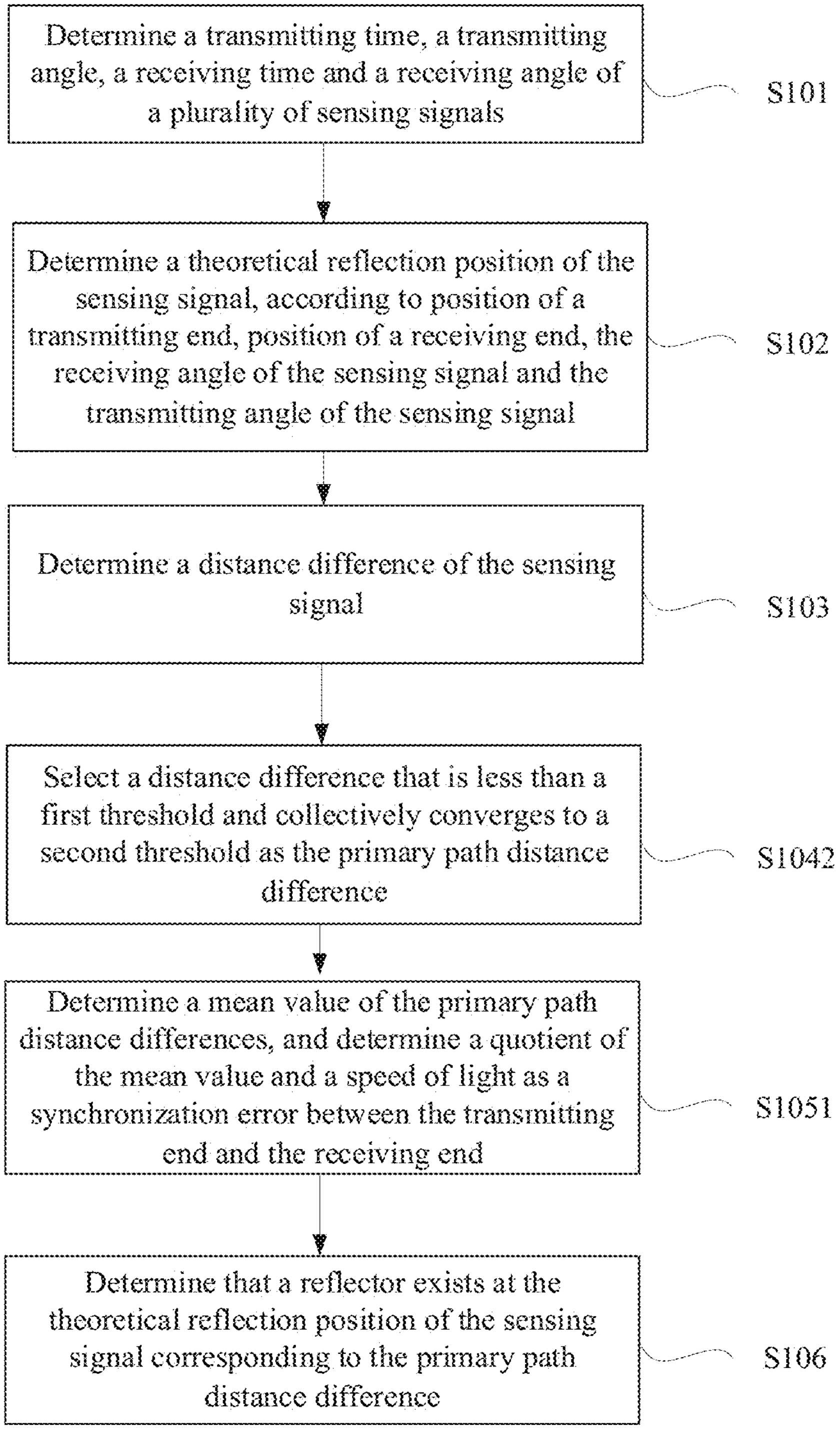
FIG. 2 is a flowchart of another method for sensing synchronization according to an example of the disclosure.

In some examples, with reference to FIG. 2, after a synchronization error between the transmitting end and the receiving end is determined according to the primary path distance difference (S105), the method further includes:

S106: it is determined that a reflector exists at the theoretical reflection position of the sensing signal corresponding to the primary path distance difference.

For the primary path distance difference determined above, it can be known that the theoretical reflection position of the corresponding sensing signal is provided with an object capable of reflecting a wireless communication signal, that is, a reflector is located at the theoretical reflection position.

Therefore, after the primary path distance difference is determined, a position of the reflector causing the primary path distance difference can be further determined, such as implementing position sensing, distance sensing, etc.

For example, by transmitting the sensing signal to the same angle at a plurality of consecutive times, it can also be determined whether the reflector at the corresponding position moves, and thus whether there is a moving object within a sensing range.

In some examples, the sensing signals include at least one of the following:

orthogonal frequency division multiplexing (OFDM) signals, and linear frequency modulation (LFM) signals.

As a manner of the example of the disclosure, the sensing signal includes, but is not limited to, an OFDM signal, an LFM signal, etc.

In some examples, the receiving angle is calculated by a spatial spectrum estimation (multiple signal classification, MUSIC) algorithm.

As a manner of the example of the disclosure, an algorithm for determining the receiving angle includes, but is not limited to, the MUSIC algorithm, etc.

In some examples, the transmitting end includes a base station; and the receiving end includes a multi-antenna receiver.

As a manner of the example of the disclosure, a form of the transmitting end includes, but is not limited to, a base station, etc. A form of the receiving end includes, but is not limited to, a multi-antenna receiver, etc.

In some examples, a wireless resource occupied by the sensing signals in the examples of the disclosure may include, but is not limited to, a time domain and frequency domain resource allocated in symbol units, subcarrier units, frame units, etc.

In some examples, the receiving end analyzes and calculates a time domain impulse response of the sensing signal received by a plurality of antennas, determines times of arrival of each sensing signal and a time interval of the impulse responses of time of arrival distribution according to an impulse response sequence, obtains multi-antenna data according to the time interval of the impulse responses of times of arrival, and analyzes an angle of arrival of a signal of each path.

In some examples, the time domain impulse responses of the sensing signal includes: a received signal and a signal transmitted from the transmitting end are subjected to time domain mathematical correlation directly, alternatively, a received time domain signal is transformed into a frequency domain, each subcarrier data is multiplied by a conjugate of frequency domain data of the signal transmitted from the transmitting end, obtained subcarrier data are transformed into a time domain, and a time domain impulse response is obtained.

In some examples, a time interval of the impulse responses of the time of multipath arrival refers to an interval consisting of a minimum sampling point time and a maximum sampling point time and having energy greater than a third threshold in a time-domain frequency-domain response. The third threshold can be obtained by simulation or set according to experience.

In some examples, the multi-antenna data may be obtained according to the time interval of the impulse responses of the time of multipath arrival. The angle of arrival of the signal of each path is analyzed. The data of a time domain time corresponding to a channel impulse response of each antenna is read according to a time domain time of each path. Then multipath angle calculation is performed to obtain an angle (receiving angle) of each path.

Illustratively, an example of the disclosure provides a method for sensing synchronization. The method may include:

A101: a transmitting base station (transmitting end) transmits a plurality of sensing signals Sj at a set time Tn (transmitting time) and on a wireless resource.

Wherein, a transmitting angle of a transmitting beam j is βj, the transmitting base station and a receiving base station (receiving end) may be synchronized or not, and there may be a direct path between them or not.

A102: the receiving base station receives multipath signals, and calculates a time of arrival Ti (receiving time) and a receiving angle αi of each path signal (sensing signal) i.

Wherein, since some of the transmitted sensing signals may not reach the receiving end, i and j may be unequal.

A103: a pseudo-range (time distance) of each path signal i is calculated as di=c*(Ti−Tn), where c is a speed of light.

A104: with reference to FIG. 4, coordinates $P_{i,O,E}$ of a path signal intersection point (theoretical reflection position) are calculated according to αi and βi.

A105: with reference to FIG. 4, a distance $d_{1,i,E}$ of $P_{i,O,E}$ to the receiving base station and a distance $d_{2,i,E}$ of $P_{i,O,E}$ to the transmitting base station are calculated, $d_{1,i,E}$ and $d_{2,i,E}$ are added to obtain $(d_{1,i,E}+d_{2,i,E})$, and a transmission distance (position distance) is obtained.

A106: a distance difference Δdi between the pseudo-range and the transmission distance of each path signal i is calculated, and Δdi is sorted according to magnitude.

That is, $\Delta di=|di-(d_{1,i,E}+d_{2,i,E})|$.

A107: all the distance differences Δdi less than a first threshold are selected and collectively converge according to a second threshold, and a set A of primary path distance differences is obtained.

That is, A={i, Δdi is less than the first threshold, and a difference between any two Δdi in the set is less than the second threshold}.

It should be understood that a minimum Δdi can also be selected as the primary path distance difference, that is, A={min Δdi}.

The first threshold and the second threshold are obtained by simulation.

A108: a synchronization error Δt between the two base stations is calculated.

That is, $$\Delta t=\frac{1}{kc}\left(\sum_{i=1}^{k}d_i\right).$$

Further, k is a number of primary path distance differences in the selected set A, and c is the speed of light.

Example 1

Figure 6:
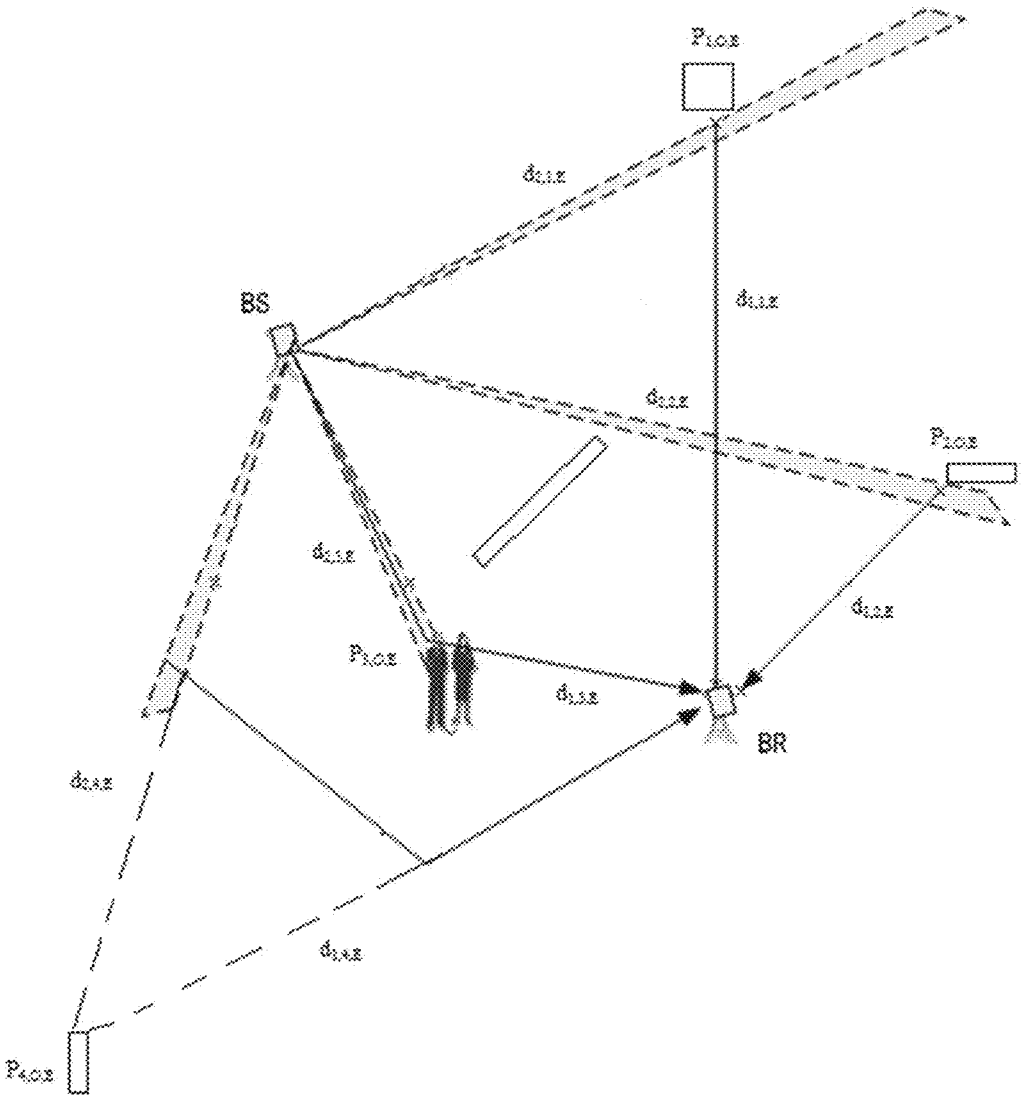
FIG. 6 is a schematic diagram of different path signal transmission in another method for sensing synchronization according to an example of the disclosure.

With reference to FIG. 6, the example of the disclosure provides a method for sensing synchronization. The method can be specifically applied to a situation that there are only fixed objects but no moving objects. The specific situation is as follows:

(1) Signal Setting

An LFM signal is used as a sensing signal, a frequency point is 3.5 GHZ, a bandwidth is 100 MHz, a sampling rate is 122.88 MHz, transmitting signal power is 43 dBm, noise power is −94 dBm, and receiving base station antennas form an 8*1 linear array.

The sensing signal is an LFM symbol transmitted once every 5 ms. Each sampling point time is Tn, and a transmitting angle of a transmitting beam j is βj.

(2) Environment Setting

A 10 m*5 m room is provided with fixed objects. Primary or secondary reflection may exist. A receiving base station (BR), a transmitting base station (BS), a reflection point (theoretical reflection position) are all in a same plane.

(3) Sensing Synchronization Process of the Example of the Disclosure

B101: the receiving base station receives multipath signals, transforms the multipath signals into a frequency domain, multiplies each subcarrier data by a conjugate of frequency domain data of the signal transmitted from the transmitting base station, transforms obtained subcarrier data into a time domain, and obtain a time domain impulse response h(t).

B102: data greater than a threshold 1 in h(t) are detected, a time of arrival Ti of each path signal i is calculated according to a peak position of the data, data in an interval greater than a third threshold near each path signal are separately extracted, a receiving angle αi is estimated by using a MUSIC algorithm, and a pseudo-range is calculated as di=c*(Ti−Tn), where c is a speed of light.

B103: intersection coordinates, that is, reflection points $P_{1,\ O,\ E}$~$P_{4,\ O,\ E}$, of αi and βi of all path signals are calculated. Distances $d_{2,\ 1,\ E}$~$d_{2,\ 4,\ E}$, and $d_{1,\ 1,\ E}$~$d_{1,\ 4,\ E}$ between the reflection points and the transmitting base station and between the reflection points and the receiving base station are calculated, and transmission distances $d_{2,\ i,\ E}+d_{1,\ i,\ E}$ are obtained.

It can be seen that the calculated transmission distances (including reflection points) are not the same as actual transmission distances for the sensing signals with a plurality of times of reflection.

B104: a distance difference Δd between the pseudo-range and a transmitting path of each reflection point is calculated.

$$\Delta di = |di - (d_{1,i,E} + d_{2,i,E})|.$$

B105: a Δdi less than a first threshold and having a difference from other Δd less than a second threshold is obtained as a primary path distance difference.

B106: a synchronization error is calculated.

Example 2

Figure 7:
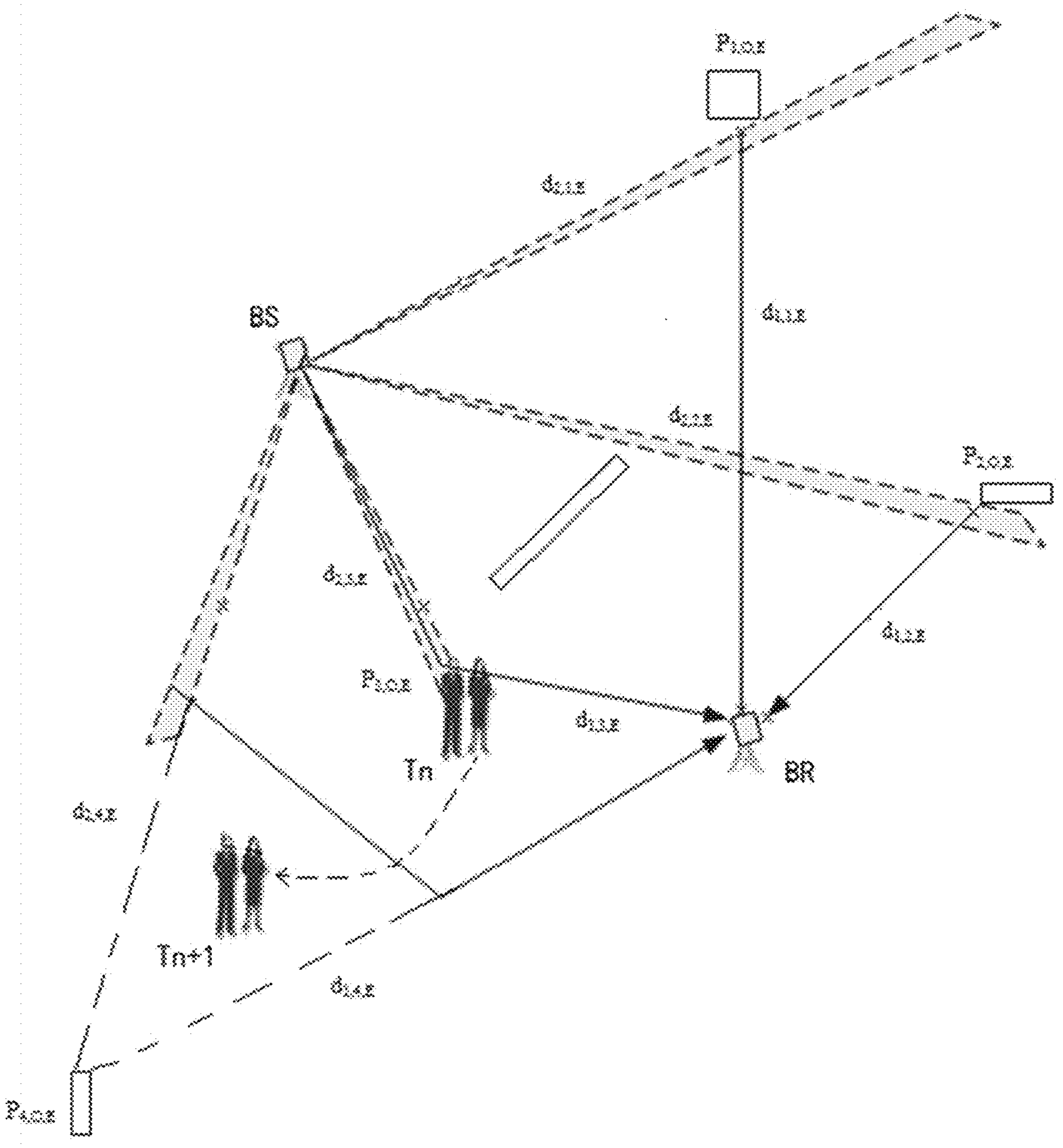
FIG. 7 is a schematic diagram of different path signal transmission in another method for sensing synchronization according to an example of the disclosure.

With reference to FIG. 7, the example of the disclosure provides a method for sensing synchronization. The method can be specifically applied to a situation that there are fixed objects and moving objects. The specific situation is as follows:

(1) Signal Setting

An LFM signal is used as a sensing signal, a frequency point is 3.5 GHZ, a bandwidth is 100 MHz, a sampling rate is 122.88 MHz, transmitting signal power is 43 dBm, noise power is −94 dBm, and receiving base station antennas form an 8*1 linear array.

The sensing signal is an LFM symbol transmitted once every 5 ms. Each sampling point time is Tn, and a transmitting angle of a transmitting beam j is βj.

(2) Environment Setting

A 10 m*5 m room is provided with fixed objects and moving objects (such as moving people in FIG. 7). Primary or secondary reflection may exist. A receiving base station (BR), a transmitting base station (BS), a reflection point (theoretical reflection position) are all in a same plane.

(3) Sensing Synchronization Process of the Example of the Disclosure

B201: the receiving base station receives multipath signals, transforms the multipath signals into a frequency domain, multiplies each subcarrier data by a conjugate of frequency domain data of the signal transmitted from the transmitting base station, transforms obtained subcarrier data into a time domain, and obtain a time domain impulse response h(t).

B202: data greater than a threshold 1 in h(t) are detected, a time of arrival Ti of each path signal i is calculated according to a peak position of the data, data in an interval greater than a third threshold near each path signal are separately extracted, a receiving angle αi is estimated by using a MUSIC algorithm, and a pseudo-range is calculated as di=c*(Ti−Tn), where c is a speed of light.

B203: intersection coordinates, that is, reflection points $P_{1,\ O,\ E}$~$P_{4,\ O,\ E}$, of αi and βi of all path signals are calculated. Distances $d_{2,\ 1,\ E}$~$d_{2,\ 4,\ E}$, and $d_{1,\ 1,\ E}$~$d_{1,\ 4,\ E}$ between the reflection points and the transmitting base station and between the reflection points and the receiving base station are calculated, and transmission distances $d_{2,\ i,\ E}+d_{1,\ i,\ E}$ are obtained.

It can be seen that the calculated transmission distances (including reflection points) are not the same as actual transmission distances for the sensing signals with a plurality of times of reflection.

B204: a distance difference Δd between the pseudo-range and a transmitting path of each reflection point is calculated.

$$\Delta di = |di - (d_{1,i,E} + d_{2,i,E})|.$$

B205: a Δdi less than a first threshold and having a difference from other Δd less than a second threshold is obtained as a primary path distance difference.

Figure 8:
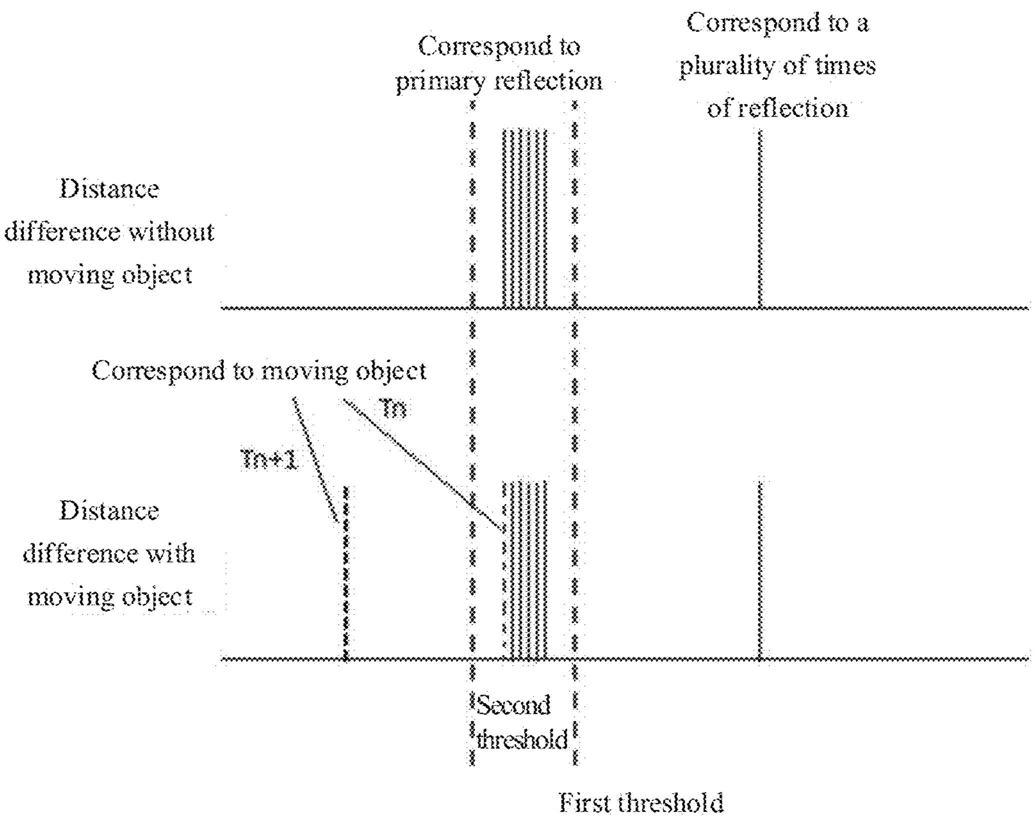
FIG. 8 shows a change in distance difference when an object moves in another method for sensing synchronization according to an example of the disclosure.

With reference to FIG. 8, for a same reflection point, when the reflection point moves from moment Tn to moment Tn+1, a reflection condition of the reflection point to the sensing signal changes, such that a corresponding distance difference Δd is also different. Therefore, distance differences corresponding to the same sensing signal can be continuously observed. In a case that a position change of the reflection point at adjacent moment is greater than a fourth threshold, it can be determined that the reflection point is a moving object (such as moving people in FIG. 7), and otherwise, the reflection point is a stationary object.

From the point of view of improving accuracy, the stationary object can be selected, and only a path signal of the stationary object can be used for subsequent calculation.

B106: a synchronization error is calculated.

Figure 9:
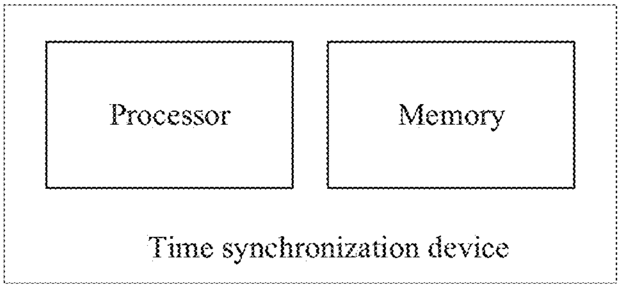
FIG. 9 is a block diagram of components of a device for sensing synchronization according to an example of the disclosure.

In a second aspect, with reference to FIG. 9, an example of the disclosure provides a device for sensing synchronization. The device includes one or more memories, and one or more processors; where the memory stores a computer program executable by the processor, and the computer program implements any one of the methods for sensing synchronization according to the examples of the disclosure when executed by the processor.

Figure 10:
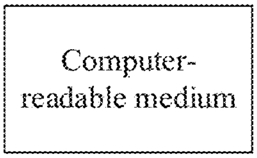
FIG. 10 is a block diagram of components of a non-transitory computer-readable medium according to an example of the disclosure.

In a third aspect, with reference to FIG. 10, the example of the disclosure provides a non-transitory computer-readable medium, storing a computer program. The computer program implements the method for sensing synchronization according to the examples of the disclosure when executed by a processor.

The processor is a device with a data processing capability, and includes, but is not limited to, a central processing unit (CPU), etc. The memory is a device with a data storage capability, and includes, but is not limited to, a random access memory (RAM, more specifically a synchronous dynamic random access memory (SDRAM), a double data rate (DDR) memory, etc.), a read-only memory (ROM), an electrically erasable programmable read-only memory (EEPROM), and a flash memory (FLASH). An I/O interface (read-write interface) is connected between the processor and the memory to implement information exchange between the memory and the processor, and includes, but is not limited to, a data bus, etc.

Those of ordinary skill in the art can understand that all or some of functional modules/units in the steps, the systems, the apparatuses disclosed above can be implemented as software, firmware, hardware, and their appropriate combinations.

In a hardware implementation, division between functional modules/units mentioned in the above description does not necessarily correspond to a division of physical components. For example, one physical component may have a plurality of functions, or one function or step may be cooperatively executed by several physical components.

Some or all of the physical components may be implemented as software executed by a processor, such as a central processing unit (CPU), a digital signal processor, or a microprocessor, or as hardware, or as an integrated circuit, such as an application specific integrated circuit. Such software may be distributed on a computer readable medium, which may include a computer storage medium (or a non-transitory medium) and a communication medium (or a transitory medium). As is well known to those of ordinary skill in the art, the term of computer storage medium includes volatile and nonvolatile, removable and non-removable media implemented in any method or technology for storing information (such as a computer readable instruction, a data structure, a program module, or other data). The computer storage medium includes, but is not limited to, a random access memory (RAM, more particularly an SDRAM, a DDR, etc.), a read-only memory (ROM), an electrically erasable programmable read-only memory (EEPROM), a flash memory (FLASH) or other magnetic disk memories; a compact disk read-only memory (CD-ROM), a digital video disk (DVD) or other optical disk memories; a magnetic cassette, a magnetic tape, a magnetic disk storage or other magnetic memories; and any other media that can be used to store desired information and can be accessed by a computer. Further, as is well known to those of ordinary skill in the art, the communication medium typically contains a computer readable instruction, a data structure, a program module, or other data in a modulated data signal such as a carrier wave or other transmission mechanisms, and may include any information delivery medium.

The disclosure has disclosed illustrative examples, and although specific terms are used, they are used as and should be interpreted in a general illustrative sense only and not for purposes of limitation. In some instances, it will be apparent to those skilled in the art that features, characteristics, and/or elements described in connection with a particular example may be used alone or in combination with those of other examples unless explicitly stated otherwise. Accordingly, it will be understood by those skilled in the art that various changes in forms and details may be made without departing from the scope of the disclosure as set forth in the appended claims.

What is claimed is:

1. A method for sensing synchronization, comprising:

determining a transmitting time, a transmitting angle, a receiving time and a receiving angle of a plurality of sensing signals;

determining a theoretical reflection position of the sensing signal, according to position of a transmitting end, position of a receiving end, the receiving angle of the sensing signal and the transmitting angle of the sensing signal;

determining a distance difference of the sensing signal, wherein the distance difference is an absolute value of a difference between a time distance and a position distance of the sensing signal, the time distance is a transmission distance of the sensing signal between the transmitting time and the receiving time, and the position distance is a sum of two distance, one distance is a distance between the theoretical reflection position of the sensing signal and the receiving end, the other one distance is a distance between the theoretical reflection position of the sensing signal and the transmitting end;

selecting a primary path distance difference from the distance differences; and determining a synchronization error between the transmitting end and the receiving end according to the primary path distance difference.

2. The method according to claim 1, wherein the selecting a primary path distance difference from the distance differences comprises:

selecting a distance difference that is less than a first threshold as the primary path distance difference.

3. The method according to claim 1, wherein the selecting a primary path distance difference from the distance differences comprises:

selecting a distance difference that is less than a first threshold and collectively converges to a second threshold as the primary path distance difference.

4. The method according to claim 1, wherein the selecting a primary path distance difference from the distance differences comprises:

selecting a minimum distance difference as the primary path distance difference.

5. The method according to claim 1, wherein the number of primary path distance differences is more than one, and the determining a synchronization error between the transmitting end and the receiving end according to the primary path distance difference comprises:

determining a mean value of the primary path distance differences, and determining a quotient of the mean value and a speed of light as the synchronization error between the transmitting end and the receiving end.

6. The method according to claim 1, wherein after the determining a synchronization error between the transmitting end and the receiving end according to the primary path distance difference, the method further comprises:

determining that a reflector exists at the theoretical reflection position of the sensing signal corresponding to the primary path distance difference.

7. The method according to claim 1, wherein the sensing signals comprise at least one of the following:

orthogonal frequency division multiplexing (OFDM) signals, and linear frequency modulation (LFM) signals.

8. The method according to claim 1, wherein the receiving angle is calculated by a spatial spectrum estimation (MUSIC) algorithm.

9. The method according to claim 1, wherein the transmitting end comprises a base station; and the receiving end comprises a multi-antenna receiver.

10. A device for sensing synchronization, comprising one or more memories, and one or more processors; wherein the memory stores a computer program executable by the processor, and the computer program implements the method for sensing synchronization according to claim 1 when executed by the processor.

11. A non-transitory computer-readable medium, storing a computer program, wherein the computer program implements the method for sensing synchronization according to claim 1 when executed by a processor.

12. The method according to claim 1, wherein the theoretical reflection position of the sensing signal is the reflective position of the theoretical reflection position when the sensing signal is reflected only once.

13. The method according to claim 1, wherein before determining a distance difference of the sensing signal, the method further comprises:

determining a transfer time, according to the transmitting time and the receiving time of the sensing signal; and determining the time distance, according to the transfer time.

14. The method according to claim 1, wherein before determining a distance difference of the sensing signal, the method further comprises:

transforming received multipath signals into a frequency domain;

multiplying each subcarrier data by a conjugate of frequency domain data of the signal;

transforming obtained subcarrier data into a time domain;

obtaining a time domain impulse response; and determining the time distance, according to the time domain impulse response.

15. The method according to claim 14, wherein the determining the time distance, according to the time domain impulse response comprises:

detecting data greater than an intended threshold in the time domain impulse response;

calculating a time of arrival Ti of each path signal i, according to a peak position of the data;

extracting the data in an interval greater than a third threshold in each path signal;

estimating the receiving angle by using an algorithm; and detecting the time distance, according to the receiving angle.

* * * * *